W. A. DARRAH.
INCANDESCENT LAMP.
APPLICATION FILED NOV. 23, 1914.
1,385,608.
Patented July 26, 1921.
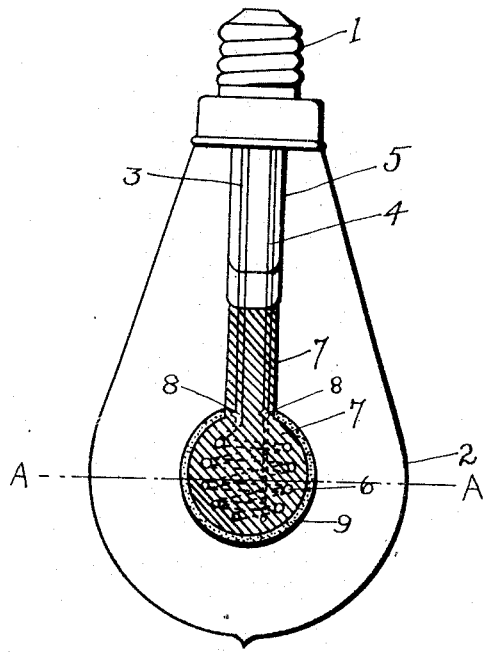
Fig. I
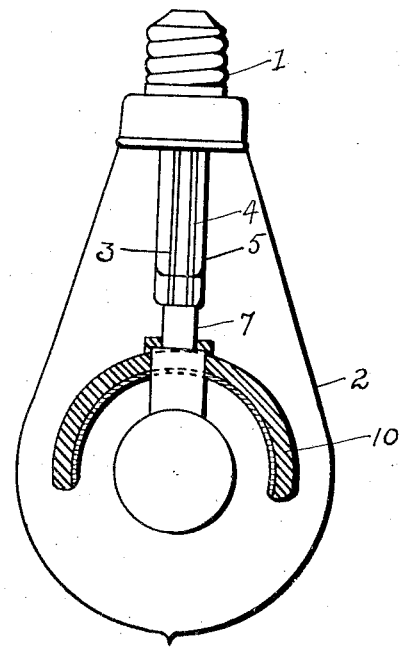
Fig. III
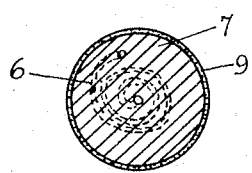
Fig. II
Fig. IV
WITNESSES:
INVENTOR
William A. Darrah

UNITED STATES PATENT OFFICE.

WILLIAM A. DARRAH, OF SWISSVALE, PENNSYLVANIA.

INCANDESCENT LAMP.

1,385,608.  Specification of Letters Patent.  Patented July 26, 1921.

Application filed November 23, 1914. Serial No. 873,644.

*To all whom it may concern:*

Be it known that I, WILLIAM A. DARRAH, a citizen of the United States, residing at 133 Gordon street, Swissvale, in the county of Allegheny and State of Pennsylvania, have invented certain new and useful Improvements in Incandescent Lamps, of which the following is a specification.

This invention relates to lamps of the type in which a radiator is raised to an incandescent temperature by the passage of an electric current. The object of the invention is to increase the efficiency and useful life of the lamp.

It is a well known fact that the luminous efficiency of an incandescent body increases very rapidly as the temperature is increased, until for a theoretical "black-body" maximum efficiency is calculated to be obtained at about 5700° C. However, as carbon boils at about 3200° C., any known filament, unsupported, is inherently fundamentally limited in efficiency. At present, commercial tungsten lamps have a maximum efficiency between .35 and .5 watt per candle, while the theoretical possible efficiency is probably higher than .08 watt per candle. These lamps, however, are handicapped by the fact that they require high currents for satisfactory operation, owing to the fact that otherwise, the rate of evaporation of the filament is rapid and the heat loss by convection through the surrounding gas is high.

I have overcome these and other difficulties by surrounding the electrical conductor with an infusible, inert, solid insulating material, which maintains these properties, even when raised to temperatures near the boiling point of carbon. One very suitable material for this purpose is boron nitrid, which maintains its inertness, strength, high resistance and solid form at temperatures higher than 4500° C. While the boron nitrid is at the present time, one of the most satisfactory materials which I have investigated, I do not wish to be confined to this material alone, as obviously, any substance having the properties listed would be equally satisfactory.

In order to secure selective radiation, and therefore, the highest possible efficiencies, it may be desirable to coat the surfaces of the refractory insulator with various compounds, which show the phenomena of selective radiation. Thus, a layer of metallic tungsten may be employed, or a coating of the materials used in the Nernst glower, providing the proper temperatures are employed, to prevent excessive vaporization or melting of these materials.

The radiation from a boron nitrid surface is, however, very efficient at the high temperatures available, so that the use of a body exhibiting selective radiation is most necessary in those cases where it is desired to use a relatively low temperature.

Referring to the drawing—Figure 1 shows a sectional elevation of one form of incandescent lamp, embodying this construction. Fig. 2 is a horizontal section on line A—A of the radiator, while Fig. 3 shows this form of lamp equipped with an economizer. Fig. 4 is a cross-sectional view of the radiator of Fig. 1 along line A—A, and is an alternate form to that shown in Fig. 2.

In Fig. 1, reference numeral (1) represents the base of the lamp, while (2) indicates the containing bulb, which may be of glass, quartz, or other transparent material, as desired. The lead wires (3—4) connect to the seal (5) in the usual manner and may conveniently be of tungsten, though other materials may be satisfactorily used. The lead wires (3—4) terminate in the heating wires (6), which are shown wound in a continuous spiral, slightly below the surface of the refractory insulating material (7), which surrounds the heating wires. I have found it satisfactory to surround the lead wires also with the same, or a similar material, as this assists in mechanically supporting the radiating element. I have also found it desirable to use lead wires having a larger section than the heating wires. The reference numeral (8) indicates the points at which the heating wires are fastened to the lead wires. The above points, together with many others, such as the material used in the various conductors, etc., are possible of many variations and it is not desired to limit this invention by such details.

An outer layer (9), of material having the property of selective radiation, may be employed, if desired, but it is not necessary, or even desirable, at extremely high temperatures. The desirability of using this material, therefore, is dependent on the temperatures employed.

While it is desirable, because of the delay in heat conduction, to place the majority of the heating coils near the surface of the radiator, as shown in Fig. 2, this is not essential, and in the case of lamps designed to operate at higher voltages, the central part of the radiator may be filled with the winding. It is also occasionally desirable to give the radiator such a shape that the ratio of volume to surface will be reduced. Thus, instead of a sphere, a disk, a spherical or cylindrical shell may be employed. The variations afford means of controlling the distribution curve of the unit and also adapt it for use on high voltages.

In constructing the radiator, it is desirable that the boron nitrid, silicon nitrid, or other insulator, closely envelop the wire used for the heating element, as it is frequently desirable to operate the heating wire very near, or even exceeding, the melting or boiling point. While the boron nitrid can successfully hold the melted tungsten in place, without appreciably attacking it, this material is only partly successful in reducing the boiling point of materials like carbon, used for the heating element and it may therefore, be desirable to surround the radiator with an inert gas at an appreciable pressure. This is not necessary when a material like tungsten is used for the heating element at lower temperatures.

In case a gas is used to surround the radiator, it is sometimes desirable to place an economizer (10) over the radiator in such a position that the gas is not allowed to circulate freely over the surface of the radiator. This reduces the heat loss, thereby increasing the efficiency.

It will be evident from the description here given, that the construction described will allow the working of known materials to much higher temperatures that has previously been possible, thereby making possible higher efficiencies.

Further, since the life of the present lamps is determined by the evaporation of the filament, with a solid body around the filament, evaporation is very much decreased and the life of the lamp will be correspondingly lengthened.

Having now fully described this invention, what I claim as new and desire to secure by Letters Patent, is as follows:

1. An electric lamp comprising a transparent envelop containing an inert gas and surrounding a radiating member containing a conductor supported in boron nitrid.

2. An electric lamp comprising a transparent container surrounding a radiating member containing a tungsten conductor embedded in and supported by boron nitrid.

3. In an electric lamp a radiating member containing a tungsten conductor embedded in and supported by boron nitrid.

4. An electric lamp comprising a transparent container surrounding a radiating member composed of a conductor wound in a concentrated form and an opaque insulating support surrounding the conductor which substantially retains its insulation at high temperatures.

5. In an electric lamp a radiator composed of a conductor arranged in a concentrated form and supported in a refractory opaque insulating material which retains its insulation at high temperatures.

6. An electric lamp comprising a transparent container surrounding a radiating member consisting of a conductor put in concentrated shape and supported in an envelop of boron nitrid.

7. In an electric lamp a radiating member containing a conductor supported in boron nitrid, the shape of said radiating member being such as to have a minimum surface for a given volume.

8. An electric lamp comprising a transparent container surrounding a radiating member consisting of a conductor inserted in and supported by boron nitrid, said radiating member being shaped to have a minimum of surface to a given volume.

9. An electric lamp comprising a transparent container surrounding a radiating member consisting of a conductor supported in boron nitrid and an economizing chamber arranged above said radiating member.

10. An electric lamp comprising a transparent container surrounding a radiating member consisting of a conductor embedded in boron nitrid the leads to said conductor being larger than the conductor supported by the boron nitrid.

11. An electric lamp comprising a transparent container surrounding a radiating member composed of a tungsten conductor molded into a refractory support which retains its insulating qualities at high temperatures.

12. An electric lamp comprising a transparent container surrounding a radiating member containing a tungsten conductor supported in boron nitrid and surrounded by a material exhibiting selective radiation.

13. An electric lamp comprising a transparent envelop, a radiating member within said envelop consisting of a conductor embedded in molded boron nitrid.

14. In an incandescent lamp a radiating member consisting of a conductor embedded in molded boron nitrid.

15. In an incandescent lamp a radiating member consisting of a concentrated tungsten filament embedded in molded boron nitrid.

In testimony whereof I affix my signature in presence of two witnesses.

WILLIAM A. DARRAH.

Witnesses:
A. F. EMMONS,
A. D. KAUFMANN.